United States Patent [19]

Miller, Jr.

[11] 4,196,945

[45] Apr. 8, 1980

[54] COMPLIANT HYDRODYNAMIC FLUID BEARING WITH CIRCUMFERENTIAL PRE-LOADING

[75] Inventor: William H. Miller, Jr., Schenectady, N.Y.

[73] Assignee: Mechanical Technology Incorporated, Latham, N.Y.

[21] Appl. No.: 974,265

[22] Filed: Dec. 29, 1978

[51] Int. Cl.$^2$ .................... F16C 32/06; F16C 39/04
[52] U.S. Cl. ........................................ 308/9; 308/121; 308/DIG. 1
[58] Field of Search ............... 308/9, 26, 36.3, 73, 308/121, 122, 240, DIG. 1, DIG. 4, DIG. 15

[56] References Cited

U.S. PATENT DOCUMENTS

| | | | |
|---|---|---|---|
| 3,809,443 | 5/1974 | Cherubim | 308/9 |
| 3,884,534 | 5/1975 | Winn | 308/9 |
| 4,118,079 | 10/1978 | Newman et al. | 308/DIG. 1 |
| 4,133,585 | 1/1979 | Licht | 308/121 |

*Primary Examiner*—Richard R. Stearns
*Attorney, Agent, or Firm*—Joseph V. Claeys; John M. Neary

[57] ABSTRACT

A compliant hydrodynamic fluid journal bearing includes a bearing sleeve having a cylindrical bore which receives a bearing sheet having a radially inwardly facing bearing surface. The bearing sheet is supported by a compliant support element having spaced resilient projections for resiliently supporting the bearing sheet. One end of the support element is welded adjacent to one end of the bearing sheet with an intervening spacer block, and the assembly is fixed in the bearing sleeve. A second block is welded adjacent to the other end of the bearing sheet so that the ends of the bearing sheet extend slightly beyond the blocks. A spring is disposed between the two blocks and is retained in place by the bearing sheet overhangs. The spring exerts a circumferential spreading force on the two blocks and through them on the two ends of the bearing sheet. This spreading force holds down the ends of the bearing sheet for two-way shaft rotation, and has the effect of seating the bearing sheet firmly against the support element, and the support element firmly against the bearing sleeve for bearing clearance control and optimized damping.

10 Claims, 2 Drawing Figures

U.S. Patent  Apr. 8, 1980  4,196,945
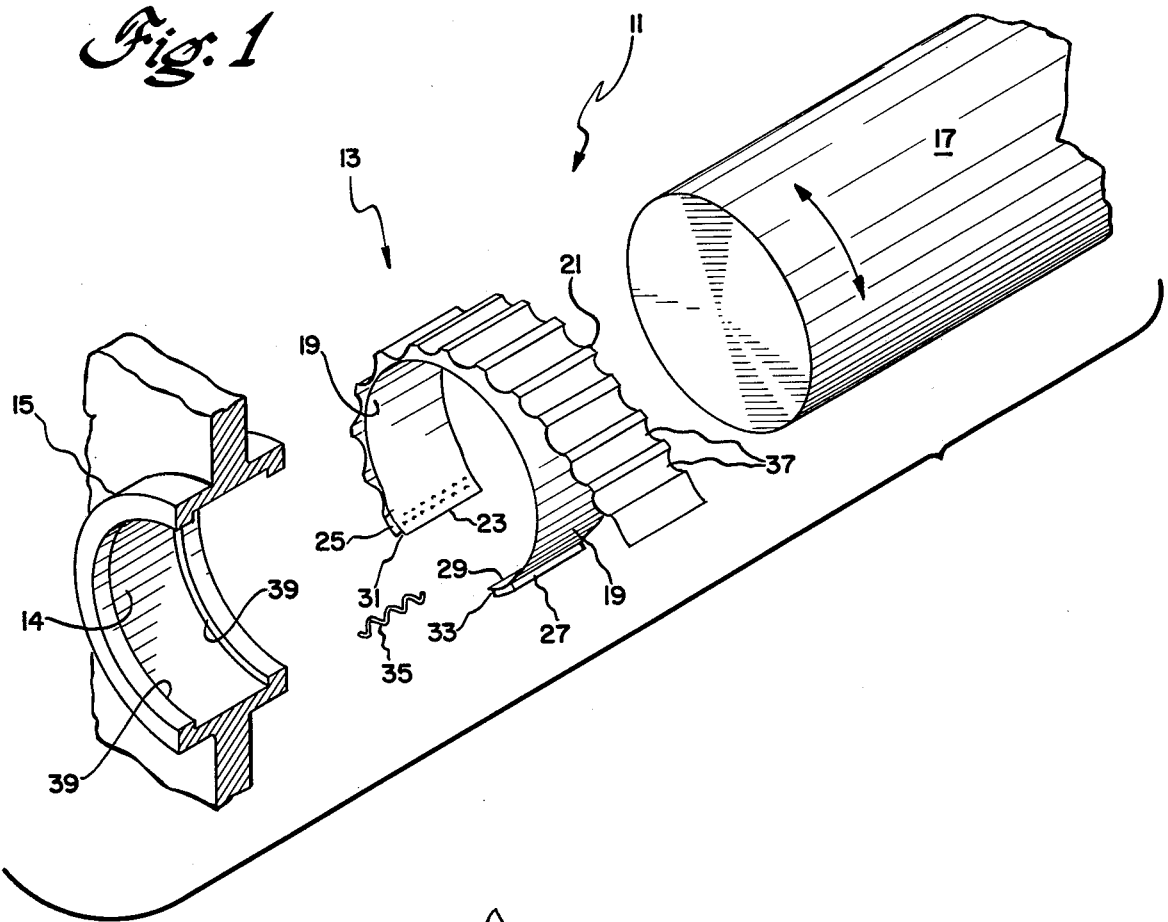
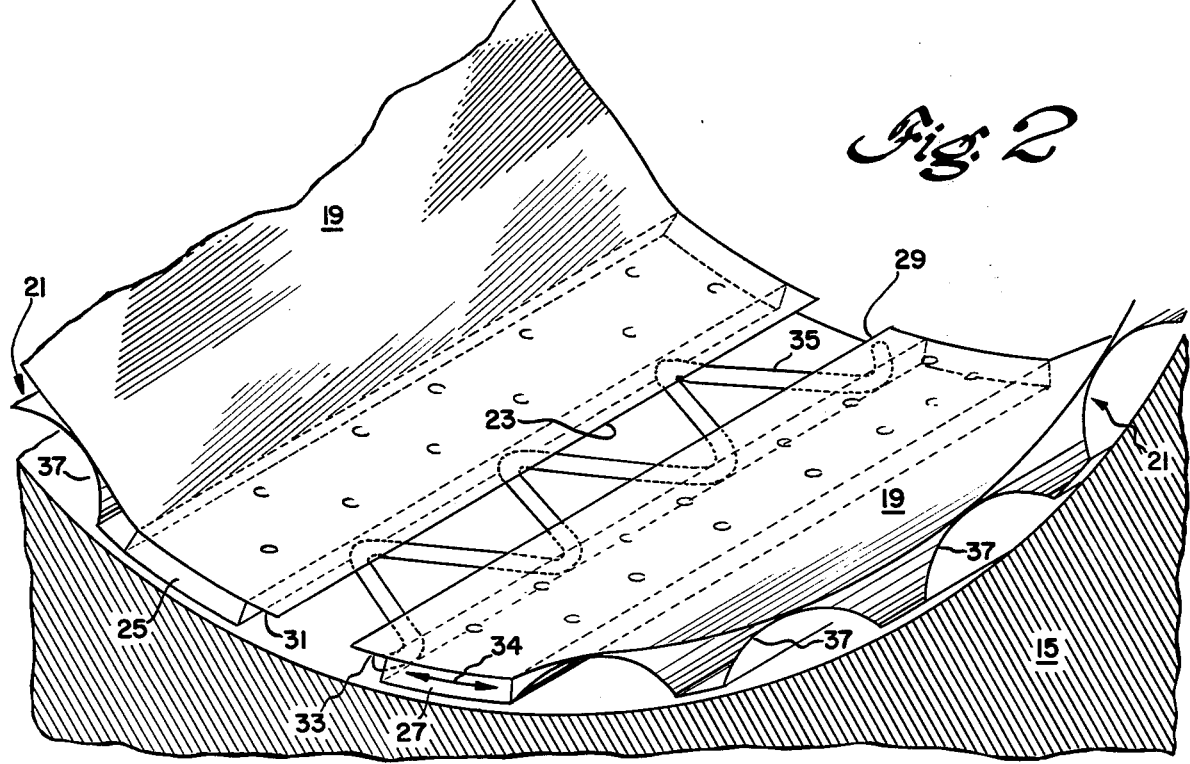

COMPLIANT HYDRODYNAMIC FLUID BEARING WITH CIRCUMFERENTIAL PRE-LOADING

BACKGROUND OF THE INVENTION

Compliant hydrodynamic fluid bearings are potentially usable in virtually every bearing application which exists today. Techniques are available for extremely low cost mass production of these bearings, and their performance capabilities are potentially superior to those of conventional bearings used today. However, difficulties exist with the application of these bearings and these difficulties have delayed their full acceptance and utilization by the art.

One difficulty with conventional hydrodynamic compliant fluid bearings is that they are usually unidirectional. This is because the bearing sheet tends to wrap around the rotating shaft and grip the shaft in the manner of a railroad band break. Attempts at preventing this problem by anchoring the free end of the bearing sheet have proven unsuccessful because it prevents the necessary freedom of motion that the bearing sheet must have to provide the necessary hydrodynamic effect.

Another difficulty with conventional fluid bearings is that the start-up torque is frequently quite high. It is believed that one reason for this difficulty is that the bearing sheet which is loose at one end is free to relax inwardly and lie flush against the shaft around the full 360° circumference. As a consequence, this large surface contact represents a substantial frictional resistance to the initiation of rotation of the shaft and, in some applications, actually prevents the rotor from starting at all.

Another tenacious problem in this art is that of bearing stability. Hydrodynamic fluid journal bearings in particular frequently exhibit various instability phenomena, of which the most difficult to solve has been the half-speed whirl phenomenon. Various solutions have been attempted to overcome this problem, but it still persists to some extent to this day. This invention contributes to the solution of this problem by improved damping. By circumferentially loading the bearing sheet in compression, snug contact is induced between the bearing sheet and support element, and between the support element and the bearing sleeve. This greatly enhances the damping effect of the bearing and tends to absorb the whirl energy and lessen the peak displacement of the shaft at the otherwise destructive phase of this phenomenon.

Other additional advantages have been obtained by this invention. For example, the improved alignment of the tape and supporting element with each other and the bearing sleeve fixes the lightly loaded bearing clearance to a specific value and also tends to promote retention of the bearing elements within the bearing sleeve, or, to put it the other way, prevent the spiraling of the bearing elements out of the bearing sleeve.

SUMMARY OF THE INVENTION

Accordingly, the objects of this invention are to provide a compliant hydrodynamic fluid journal bearing which can operate in either direction. This bearing has a low start-up torque and reduced power losses during the early phases of operation. The bearing also has enhanced damping characteristics and improved alignment of the bearing elements in the bearing sleeve for a more precise bearing clearance value, and ease of assembly and repair.

These and other objects of the invention are satisfied by one embodiment of the invention wherein the two ends of a bearing sheet of a compliant hydrodynamic fluid journal bearing are circumferentially pre-loaded in compression to urge the sheet outwardly against the compliant supporting element and towards the bearing sleeve.

DESCRIPTION OF THE DRAWINGS

The invention and its objects will be better understood by reference to the following detailed description when read in connection with the following drawings, wherein:

FIG. 1 is an elevation, partly in section, of a journal bearing according to this invention; and FIG. 2 is an enlarged perspective view of the bearing shown in FIG. 1 in the area of the ends of the bearing sheet.

DESCRIPTION OF THE PREFERRED EMBODIMENT

Referring now to the drawings, wherein like reference characters designate identical or corresponding parts, and more particularly to FIG. 1 thereof, a journal bearing 11 is shown having a bearing assembly 13 which fits within the bore 14 of a bearing cartridge or sleeve 15. A shaft 17 fits within the bore 14 of the bearing sleeve 15 and defines between the shaft 17 and bore 14 a gap within which the bearing assembly 13 is received.

The bearing assembly 13 includes a flexible bearing sheet 19 and a resilient supporting element 21 which supports the bearing sheet 19 in the bore 14 of the bearing sleeve 15. One end 23 of the bearing assembly 13 includes a spacer block 25 to which the bearing sheet 19 is resistance-welded and to which the resilient supporting element 21 is also resistance-welded. All of the elements of the bearing assembly 13 are thus welded together at the end 23.

A second spacer block 27 is welded adjacent the other end 29 of the bearing sheet 19. This weld may also be a resistance type weld. The blocks 25 and 27 are not welded at the extreme end edges of the bearing sheet 19 to provide a slight overhang or lip 31 and 33 respectively, for a purpose which will appear presently.

Referring now to FIG. 2, the spacer block 25 is shown welded to the wall of the sleeve 15 to prevent the bearing assembly 13 from rotating relative to the sleeve 15. The spacer block 27 is not welded to the wall of the sleeve 15 but is free to slide circumferentially, as indicated by arrow 34, relative to that wall. A spring 35 shown here in the form of a serpentine spring, is disposed between and bearing against the two spacer blocks 25 and 27 and urging them apart. The effect of the spring is to put the bearing sheet 19 in compression and urge it radially outward against the resilient supporting element 21. This, in turn, pushes the element 21 against the wall 14 of the bearing sleeve 15 so that the bearing sheet 19 is in snug contact with the support element 21 which, in turn, is in snug contact with the wall of the bearing sleeve 15.

The resilient support element 21 is formed of a sheet of material similar to the material of bearing sheet 19. It is annealed, die formed in the corrugated form illustrated, and then heat treated to give it the desired qualities of resilience and strength. The corrugations or bumps give resilient support to the bearing sheet 19 but will deflect to accommodate various load distributions. In addition, the bearing can conform to the shape of the shaft 17 as it undergoes dimensional changes such as centrifugal and thermal growth. The close spacing of the projections on the support element enables the bearing sheet 19 to assume a profile that facilitates the generation of a hydrodynamic fluid film for supporting the shaft 17.

Referring now to FIG. 2, the height of the spacer blocks 25 and 27 is less than the height of the projections 37 on the resilient support element 21 so that an inclined or converging wedge is formed by the bearing sheet and the first projection on the resilient support element 37 to promote the formation of a hydrodynamic supporting fluid film. In addition, the spacer blocks 25 and 27 are wide in the circumferential direction with respect to their height to forestall any tendency of the spacer blocks 25 and 27 to tilt under the influence of the spring 35. Any such tendency is further reduced by the small height of these spacer blocks, typically less than 20 mils.

In operation, the shaft 17, rotating in either direction with respect to the bearing sheet 19, lies with its axis slightly below the axis of the bearing sleeve 15. This produces a converging wedge-shaped space between the shaft 17 and the bearing sheet 19 tapering to the line of closest spacing between the shaft and the bearing sheet 19. The ability of the bearing sheet to conform to the shape of the shaft by virtue of the resilient support of the supporting element 21 increases the area of the wedge-shaped zone and thus increases the load-bearing capacity of this bearing. When starting torque is applied to the shaft, the only area of contact between the shaft and the bearing sheet 19 is along a single line where the shaft contacts the bearing along the bottom line of the shaft. The spring 35, exerting a circumferential spreading force on the ends of the bearing sheet 19, prevents the bearing sheet 19 from contacting the shaft around its entire circumference which it would otherwise do. The start-up torque is thus greatly reduced.

As the shaft speed increases to the speed at which hydrodynamic effects can begin to occur, the wedge-shaped zone between the shaft and the bearing sheet is already in existence, so it is not necessary for the internal fluid pressure within the bearing to increase enough to force the bearing sheet 19 away from the shaft. Thus, the generation of hydrodynamic supporting films can occur at an earlier time than would be the case if the bearing sheet were free to lie against the shaft.

When the shaft 17 has reached operating speed, any orbiting or oscillation of the shaft with respect to the bearing sheet 19 will cause relative movement between the bearing sheet 19 and the resilient supporting element 21. Since the contact between the sheet 19 and the element 21 is maintained snug around the entire bearing sleeve by the spring 35, the energy of the shaft oscillations which causes relative movement can be absorbed more readily by the coulomb damping which exists between the sheet 19 and the tops of the resilient projections 37, and also between the areas of the element 21 between the projections 37 which are maintained in snug contact with the bore of the sleeve 15 by the effect of the spring 35. Thus, the energy of shaft oscillation is more readily absorbed by the bearing of this design than by bearings wherein the end of the bearing sheet 19 is not circumferentially pre-loaded in compression.

The spring 35 may be replaced with other arrangements which can exert a spreading force on the ends of the bearing sheet 19. Thus, any suitable separating mechanism, whether mechanical, pneumatic, magnetic, electrostatic, etc., may be used to exert a spreading force on the ends of the sheet 19.

The bearing assembly 13 is retained in the sleeve 15 by a pair of axially spaced shoulders 39. The radial dimension of the shoulders is approximately one-half the radial dimension of the resilient projection 37 on the element 21. This prevents contact between the shaft 17 and the radially facing area of the shoulders 39 which might otherwise occur in the event of shaft misalignment, but the height of the shoulder is sufficient to prevent the bearing assembly from spiraling out of the sleeve 15. This is particularly true because the spring 35 maintains the sheet 19 and the element 21 in snug contact with each other and the element 21 in snug contact with the wall of the sleeve 15 so that the bearing element 13 is prevented from climbing over the shoulder 39 and spiraling out of the bearing sleeve 15. In addition, the shoulders retain the spring 35 itself within the sleeve 15.

Obviously, numerous modifications and variations of the disclosed embodiment are possible in view of the disclosure contained herein. For example, the serpentine spring could be replaced with two separate individual springs acting on the two spacer blocks from the other side, leaving the space between the blocks clear. Alternatively, one of the spacer blocks can be welded to the sleeve and the spring can operate between the other spacer block and some other fixed structure in the sleeve such as a shoulder or slot. Accordingly, it is expressly to be understood that these variations and modifications and equivalents thereof may be practiced while remaining within the spirit and scope of the invention, which is defined by the appended claims, wherein:

I claim:

1. A compliant hydrodynamic fluid journal bearing comprising:
   a bearing sleeve having formed therein a bore;
   a shaft received within said bore and defining a gap between the shaft and wall of said bore;
   a bearing assembly received within said gap and including a resilient support element in contact with said bore wall and a flexible bearing sheet in contact with said support element and having a bearing surface facing said shaft;
   one end of said bearing sheet being attached to one end of said resilient support element with a first spacer block therebetween, defining one end of said bearing assembly;
   the other end of said bearing sheet having attached on the face thereof opposite said bearing face a second spacer block;
   resilient means bearing on at least one of said spacer blocks for urging said spacer blocks circumferentially apart;
   whereby said resilient means loads said bearing sheet in compression, urging it radially outward snug against said support element, and urging said support element in snug contact with the wall of said bearing sleeve so that (a) the bearing clearance is held to a specified value, (b) the bearing sheet contacts said shaft only on a limited circumferential area for reduced start-up torque, (c) the damping characteristic of the bearing is optimized, and (d) the shaft is enabled to rotate in either direction.

2. The bearing defined in claim 1, wherein said one end of said bearing assembly is fixed in said bearing sleeve against rotational movement with respect to said bearing sleeve, and the other end is free to slide circumferentially.

3. The bearing defined in claim 2, wherein said resilient support element is a corrugated spring member having regular raised projections and intervening flat lands which engage the wall of said bore for coulomb damping.

4. The bearing defined in claim 3, wherein said spacer blocks are shorter than said projections, and circumferentially wider than they are high.

5. The bearing defined in claim 2, wherein said resilient means includes a serpentine spring disposed between said spacer blocks and urging said second spacer block circumferentially away from said first spacer block.

6. The bearing defined in claim 5, wherein said spacer blocks are fastened to said bearing sheet at a position displaced back from the end edges of said bearing sheet so that said end edges of said bearing sheet overhang said bearing sheet and retain said serpentine spring between said blocks against radial movement therefrom.

7. The bearing defined in claim 6, further comprising raised shoulders on the axial ends of said sleeve in said bore to retain said bearing assembly and serpentine spring in place against axial translation.

8. The bearing defined in claim 1, wherein said resilient means includes a serpentine spring disposed between said spacer blocks and bearing against adjacent faces thereof.

9. The bearing defined in claim 8, wherein said spacer blocks are fastened to said bearing sheet at a position displaced back from the end edges of said bearing sheet so that said end edges of said bearing sheet overhang said bearing sheet and retain said serpentine spring between said blocks against radial movement therefrom.

10. The bearing defined in claim 9, further comprising raised shoulders on the axial ends of said sleeve in said bore to retain said bearing assembly and serpentine spring in place against axial translation.

* * * * *